(12) United States Patent
Liles et al.

(10) Patent No.: US 12,044,143 B2
(45) Date of Patent: Jul. 23, 2024

(54) GAS TURBINE ENGINE COMPONENT WITH MANIFOLD CAVITY AND METERING INLET ORIFICES

(71) Applicant: RAYTHEON TECHNOLOGIES CORPORATION, Farmington, CT (US)

(72) Inventors: Howard J. Liles, Newington, CT (US); Tyler G. Vincent, Portland, CT (US); Bryan H. Farrar, West Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/553,928

(22) Filed: Dec. 17, 2021

(65) Prior Publication Data

US 2023/0193764 A1 Jun. 22, 2023

(51) Int. Cl.
*F01D 5/18* (2006.01)
*F01D 5/28* (2006.01)

(52) U.S. Cl.
CPC .............. *F01D 5/187* (2013.01); *F01D 5/282* (2013.01); *F01D 5/284* (2013.01); *F05D 2240/304* (2013.01); *F05D 2260/202* (2013.01); *F05D 2260/2214* (2013.01); *F05D 2300/6033* (2013.01)

(58) Field of Classification Search
CPC .......... F01D 5/186; F01D 5/188; F01D 5/284; F01D 5/282; F01D 5/187; F05D 2300/6033; F05D 2260/2214; F05D 2260/202; F05D 2240/304
See application file for complete search history.

(56) References Cited

U.S. PATENT DOCUMENTS

| | | | |
|---|---|---|---|
| 6,179,565 B1 * | 1/2001 | Palumbo | F01D 5/187 415/115 |
| 6,234,754 B1 * | 5/2001 | Zelesky | B22C 9/10 415/115 |
| 6,471,479 B2 | 10/2002 | Starkweather | |
| 6,666,654 B2 * | 12/2003 | Olhofer | F01D 5/141 416/228 |
| 8,096,770 B2 | 1/2012 | Liang | |
| 8,840,363 B2 | 9/2014 | Lee | |

(Continued)

OTHER PUBLICATIONS

European Search Report and Written Opinion for European Patent Application No. 22214381.0 mailed May 11, 2023.

*Primary Examiner* — Courtney D Heinle
*Assistant Examiner* — Andrew Thanh Bui
(74) *Attorney, Agent, or Firm* — Carlson, Gaskey & Olds, P.C.

(57) ABSTRACT

A gas turbine engine component includes a supply cavity and a manifold cavity that shares a common divider wall with the supply cavity. The common divider wall includes inlet metering holes that connect the supply cavity and the manifold cavity. An exterior wall has an exterior surface and an opposed interior surface that bounds portions of the supply cavity and of the manifold cavity. Outlet cooling holes extend through the exterior wall and connect the manifold cavity with the exterior surface. The number of the inlet metering holes is equal to or less than the number of the outlet cooling holes, and at least one of the inlet holes is coaxial with at least one of the outlet holes.

10 Claims, 3 Drawing Sheets

(56) References Cited

U.S. PATENT DOCUMENTS

| | | | |
|---|---|---|---|
| 8,894,363 B2 * | 11/2014 | Lee | F01D 5/184 |
| | | | 415/178 |
| 10,767,494 B2 | 9/2020 | Hillier | |
| 11,180,999 B2 | 11/2021 | Decesare et al. | |
| 2008/0286115 A1 | 11/2008 | Liang | |
| 2009/0041586 A1 * | 2/2009 | Bacha | F01D 9/04 |
| | | | 416/232 |
| 2009/0068021 A1 | 3/2009 | Liang | |
| 2014/0003937 A1 | 1/2014 | Grooms | |
| 2021/0189889 A1 * | 6/2021 | Decesare | C04B 35/515 |

\* cited by examiner

US 12,044,143 B2

GAS TURBINE ENGINE COMPONENT WITH MANIFOLD CAVITY AND METERING INLET ORIFICES

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils in the turbine section, as well as other components that operate in high-temperature environments in the engine, may be formed of a superalloy and may include thermal barrier coatings to extend temperature capability and lifetime. Ceramic matrix composite ("CMC") materials are also being considered for such components. Among other attractive properties, CMCs have high temperature resistance. Despite this attribute, however, there are unique challenges to implementing CMCs.

SUMMARY

A gas turbine engine according to an example of the present disclosure includes a supply cavity and a manifold cavity that shares a common divider wall with the supply cavity. The common divider wall includes inlet metering holes that connect the supply cavity and the manifold cavity, an exterior wall that has an exterior surface and an opposed interior surface that bounds portions of the supply cavity and of the manifold cavity, and outlet cooling holes that extend through the exterior wall and connect the manifold cavity with the exterior surface. The number of the inlet metering holes is equal to or less than the number of the outlet cooling holes, and at least one of the inlet holes is coaxial with at least one of the outlet holes.

In a further embodiment of any of the foregoing embodiments, a ratio of the number of the inlet metering holes to the number of the outlet cooling holes is from 1:1 to 1:6.

In a further embodiment of any of the foregoing embodiments, the common divider wall isolates the manifold cavity from the supply cavity except for the inlet metering holes.

In a further embodiment of any of the foregoing embodiments, the exterior wall and the common divider wall are formed of a ceramic matrix composite.

A gas turbine engine component according to an example of the present disclosure includes an airfoil section that defines suction and pressure sides and leading and trailing ends. The airfoil section is formed of a fiber-reinforced composite and includes a supply cavity, a radially-elongated manifold cavity that shares a common divider wall with the supply cavity, and an exterior wall that has an exterior surface and an opposed interior surface that bounds portions of the supply cavity and of the manifold cavity. The common divider wall includes one or more inlet metering holes that connect the supply cavity and the manifold cavity, and the exterior wall includes outlet cooling holes that connect the manifold cavity with the exterior surface. The number of the inlet metering holes is equal to or less than the number of the outlet cooling holes, at least one of the outlet holes opens at the trailing end, and at least one of the outlet holes opens to either the pressure side or the suction side.

In a further embodiment of any of the foregoing embodiments, a ratio of the number of the one or more inlet metering holes to the number of the outlet cooling holes is from 1:1 to 1:6.

In a further embodiment of any of the foregoing embodiments, the common divider wall isolates the manifold cavity from the supply cavity except for the one or more inlet metering holes.

In a further embodiment of any of the foregoing embodiments, the at least one of the outlet cooling holes that opens to the trailing end is coaxial with at least one of the one or more inlet metering holes.

In a further embodiment of any of the foregoing embodiments, at least one of the outlet cooling holes that opens to either the pressure side or the suction side is radially offset from one of the outlet cooling holes that opens at the trailing end.

In a further embodiment of any of the foregoing embodiments, in the radial direction the outlet cooling holes alternate between opening at the trailing end and opening to either the pressure side or the suction side.

In a further embodiment of any of the foregoing embodiments, the fiber-reinforced composite is a ceramic matrix composite.

In a further embodiment of any of the foregoing embodiments, the radially-elongated manifold cavity is in a filler region between fiber plies of the ceramic matrix composite.

A gas turbine engine according to an example of the present disclosure includes a compressor section, a combustor in fluid communication with the compressor section, and a turbine section in fluid communication with the combustor. At least one of the combustor or the turbine section includes a component that has a supply cavity and a manifold cavity that shares a common divider wall with the supply cavity. The common divider wall includes inlet metering holes that connect the supply cavity and the manifold cavity, an exterior wall having an exterior surface and an opposed interior surface that bounds portions of the supply cavity and of the manifold cavity, and outlet cooling holes that extend through the exterior wall and that connect the manifold cavity with the exterior surface. The number of the inlet metering holes is equal to or less than the number of the outlet cooling holes, and at least one of the inlet holes is coaxial with at least one of the outlet holes.

In a further embodiment of any of the foregoing embodiments, a ratio of the number of the inlet metering holes to the number of the outlet cooling holes is from 1:1 to 1:6.

In a further embodiment of any of the foregoing embodiments, the at least one of the outlet cooling holes that opens to the trailing end is coaxial with at least one of the inlet metering holes.

In a further embodiment of any of the foregoing embodiments, the at least one of the outlet cooling holes that opens to either the pressure side or the suction side is radially offset from the at least one of the outlet cooling holes that opens at the trailing end.

In a further embodiment of any of the foregoing embodiments, in the radial direction the outlet cooling holes alternate between opening at the trailing end and opening to either the pressure side or the suction side.

In a further embodiment of any of the foregoing embodiments, the common divider wall isolates the manifold cavity from the supply cavity except for the inlet metering holes.

In a further embodiment of any of the foregoing embodiments, the exterior wall and the common divider wall are formed of a ceramic matrix composite.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
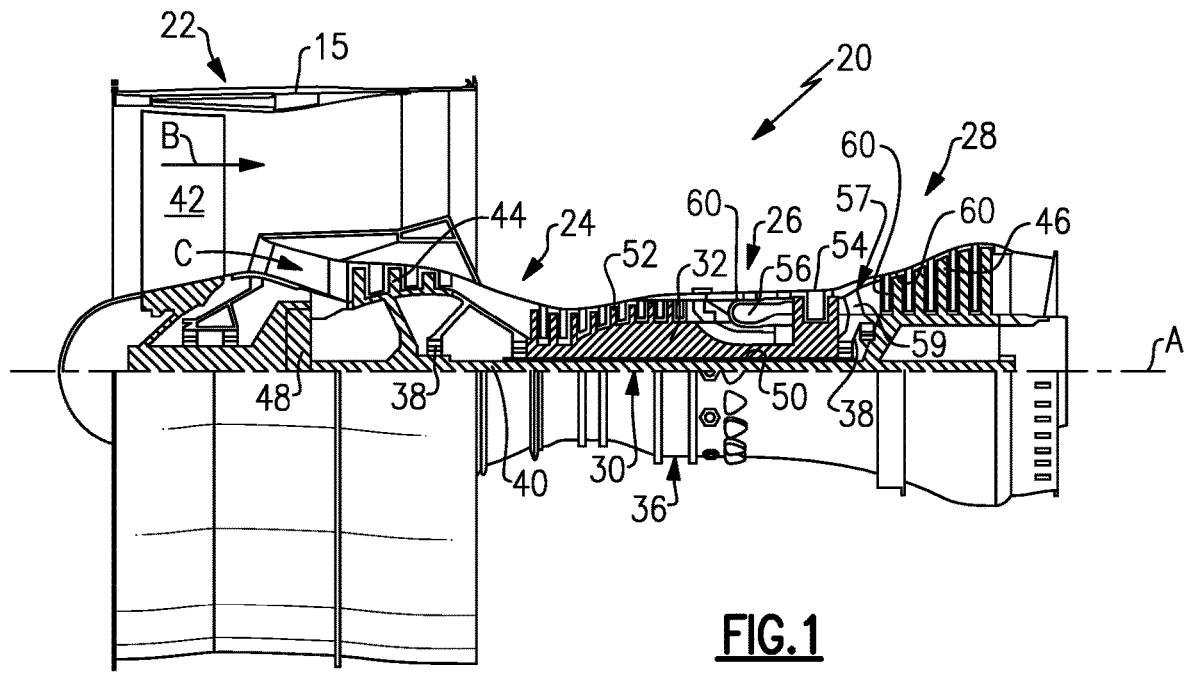
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(\text{Tram } ^\circ \text{R})/(518.7^\circ \text{R})]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
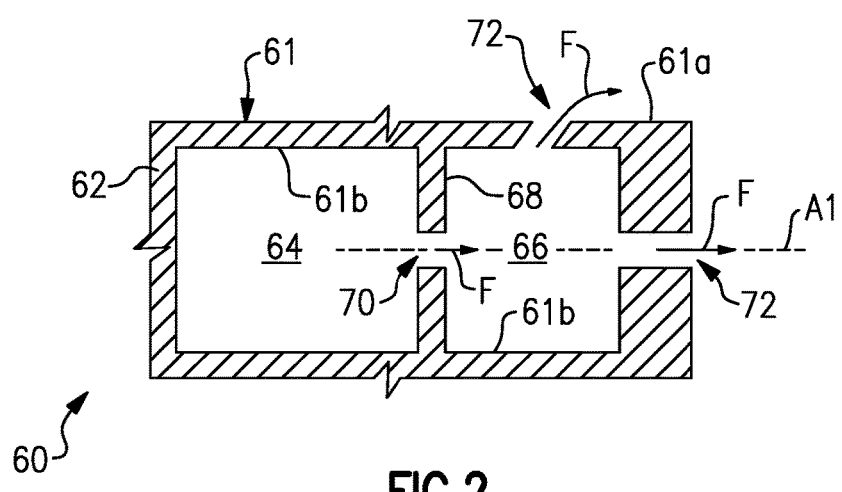
FIG. 2 illustrates a gas turbine engine component of the gas turbine engine.
Figure 3A:
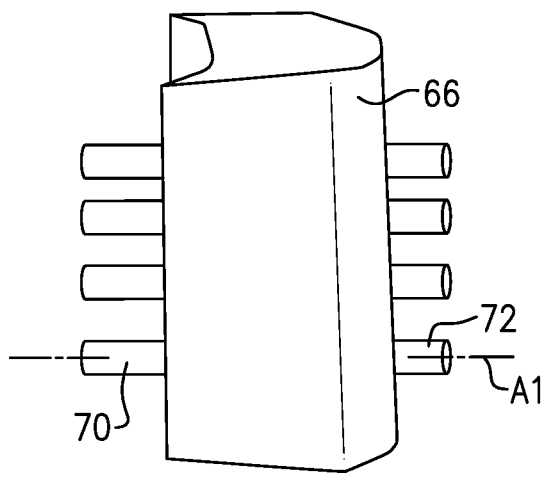
FIG. 3A illustrates a manifold cavity that has a ration of inlets to outlets of 1:1.
Figure 3B:
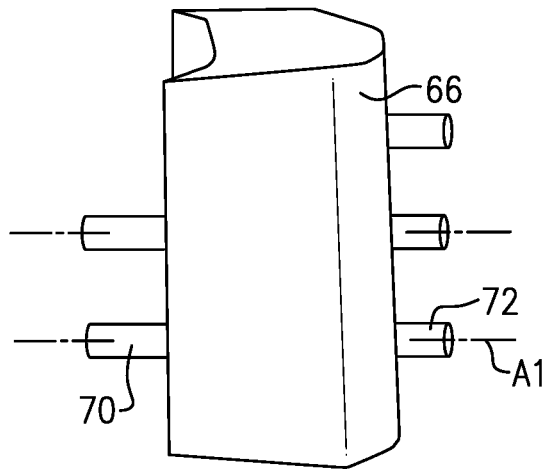
FIG. 3B illustrates a manifold cavity that has a ration of inlets to outlets of 2:3.
Figure 3C:
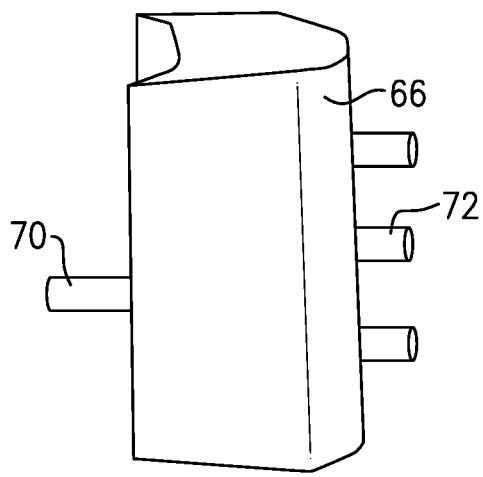
FIG. 3C illustrates a manifold cavity that has a ration of inlets to outlets of 1:3.
Figure 3D:
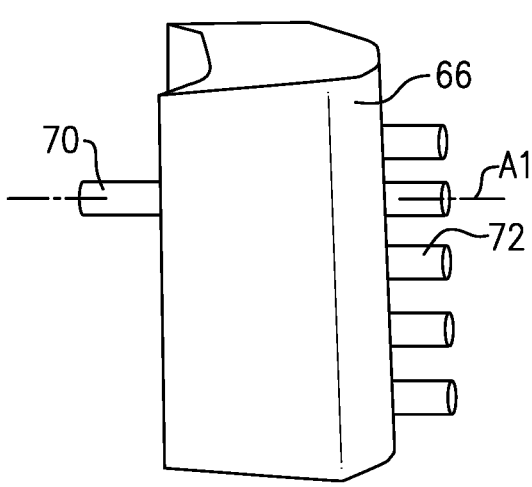
FIG. 3D illustrates a manifold cavity that has a ration of inlets to outlets of 1:5

FIG. 2 illustrates a sectioned view of a representative portion of a component 60 from the engine 20 (see also FIG. 1). For instance, the component 60 is a turbine vane, a blade outer air seal, or a combustor panel. It is to be understood, however, that the examples herein may be applied to other cooled components of the engine 20.

The component 60 includes component walls 61 that are formed of a fiber-reinforced composite 62. Although embodiments herein may be based on the fiber-reinforced composite 62 being a ceramic matrix composite, the examples may also be applicable to other composites such that the fiber-reinforced composite 62 may alternatively be an organic matrix composite (OMC) or a metal matrix composite (MMC). For instance, the ceramic matrix composite (CMC) is formed of ceramic fiber tows (e.g., in the form of plies) that are disposed in a ceramic matrix. The ceramic matrix composite may be, but is not limited to, a SiC/SiC ceramic matrix composite in which SiC fiber tows are disposed within a SiC matrix. Example organic matrix composites include, but are not limited to, glass fiber tows, carbon fiber tows, and/or aramid fiber tows disposed in a polymer matrix, such as epoxy. Example metal matrix composites include, but are not limited to, boron carbide fiber tows and/or alumina fiber tows disposed in a metal matrix, such as aluminum. The fiber tows are arranged in a fiber architecture, which refers to an ordered arrangement of the tows relative to one another, such as a 2D woven ply or a 3D structure.

The component 60 includes a supply cavity 64 and a manifold cavity 66 that shares a common divider wall 68 with the supply cavity 64. The divider wall 68 includes one or more inlet metering holes 70 (one shown) that connect the supply cavity 64 and the manifold cavity 66. For example, the divider wall 68 isolates the manifold cavity 66 from the supply cavity 64 except for the inlet metering holes 70. The component wall 61 includes an exterior surface 61a and an opposed interior surface 61b that bounds portions of the supply cavity 64 and of the manifold cavity 66. There are outlet cooling holes 72 that extend through the component wall 61 and connect the manifold cavity 66 with the exterior surface 61a. For instance, the outlet cooling holes 72 may be uniform cross-section holes, diffuser holes, or combinations of different types of these holes that break out at the exterior surface 61a.

The number of the inlet metering holes 70 is equal to or less than the number of the outlet cooling holes 72. Additionally, in this example and although not limited, at least one of the inlet holes 70 is coaxial (see axis A1) with at least one of the outlet holes 72. For example, a ratio of the number of the inlet metering holes 70 to the number of the outlet cooling holes 72 is from 1:1 to 1:6. FIGS. 3A, 3B, 3C, and 3D illustrate solid depictions of the manifold cavity 66, inlet metering holes 70, and outlet cooling holes 72 in different ratios. For instance, in FIG. 3A the ratio of the number of the inlet metering holes 70 to the number of the outlet cooling holes 72 is 1:1; in FIG. 3B the ratio of the number of the inlet metering holes 70 to the number of the outlet cooling holes 72 is 2:3; in FIG. 3C the ratio of the number of the inlet metering holes 70 to the number of the outlet cooling holes 72 is 1:3; and in FIG. 3D the ratio of the number of the inlet metering holes 70 to the number of the outlet cooling holes 72 is 1:5. It is to be understood that the ratios herein are given in terms of the numbers of holes 70/72, as opposed to an area ratio of the total area of inlet metering holes 70 to the total area of outlet cooling holes 72. In a further example of any of the above examples, however, the area ratio of the inlet metering holes 70 to the outlet cooling holes 72 is 1:1 or less. For instance, the area ratio is <1:1 (less than one to one). For fully metered (i.e. choked) flow, such ratios permit additional outlet cooling holes 72 to be used and/or additional area of the outlet cooling holes 72 without increasing the total flow. Additionally, the disclosed configurations may facilitate more uniform cooling distribution in comparison to center-flow cooling schemes and thereby enable less total flow to be used. There is an upper limit to the ratio determined by the outflow/backflow margin of the outlet cooling holes 72 to the core gaspath. The process of metering flow causes total pressure loss, which is maintained for adequate outflow. Given this disclosure, one of ordinary skill in the art will be able to select useful number and area ratios to meet their particular needs for an implemented configuration.

At least the inlet metering holes 70 and the outlet cooling holes 72 may be formed by one or more machining operations, such as but not limited to rotary tooling, electro-discharge machining, water-guided laser jet, ultrasonic impact grinding, and/or ablative laser machining. In this regard, by having the inlet metering holes 70 coaxial with outlet cooling holes 72, the holes 70/72 can be machined in one continuous machining operation. For instance, the machining is conducted from the outside of the component 60 by boring into the wall 61 to first form the outlet cooling hole 72. The boring is then continued along the same axis to then also form the corresponding inlet metering hole 70. Thus, the inlet metering holes 70 need not be formed in a separate operation or from the inside of the component 60.

During operation of the engine 20, cooling air F, such as bleed air from the compressor section 24, is provided to the supply cavity 64. At least a portion of this cooling air flows through the inlet metering holes 70 into the manifold cavity 66. The inlet metering holes 70 restrict flow and thus serve to meter the supply of cooling air into the manifold cavity 66. The manifold cavity 66 serves as a pressure equalizing region that distributes cooling air F to the outlet cooling holes 72, which discharge the cooling air F to the exterior surface 61a for film cooling. The inlet metering holes 70 and manifold cavity 66 permit the cooling air to be metered "upstream" of the outlet cooling holes 72, thereby providing greater flexibility during design for the location of the outlet cooling holes to manage maximum temperatures and thermal gradients.

Figure 4:
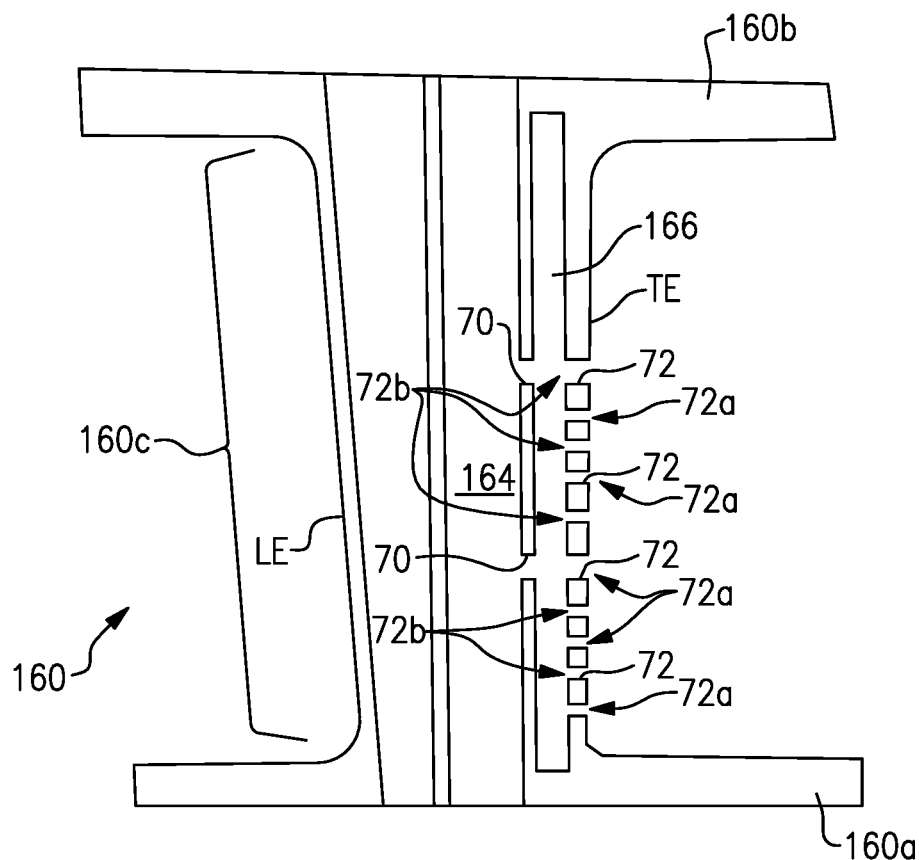
FIG. 4 illustrates an example turbine airfoil that has a manifold cavity.
Figure 5:
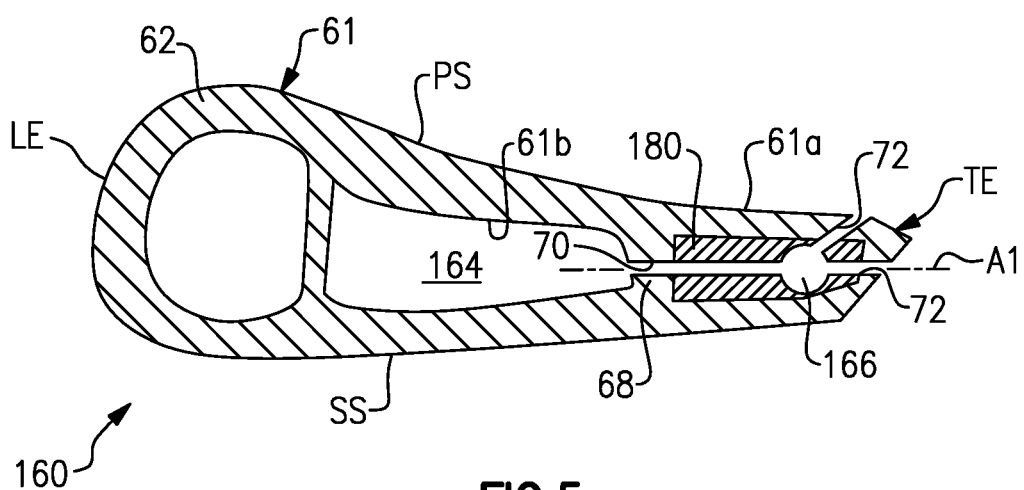
FIG. 5 illustrates a sectioned view of the turbine airfoil.

FIG. 4 illustrates a radially sectioned view of another example component 160, and FIG. 5 illustrates an axially sectioned view of the component 160. In this disclosure, like reference numerals designate like elements where appropriate and reference numerals with the addition of one-hundred or multiples thereof designate modified elements that are understood to incorporate the same features and benefits of the corresponding elements. As shown, the component 160 is a turbine vane that includes first and second platforms 160a/160b and an airfoil section 160c there between. The airfoil section 160c defines a leading end (LE), a trailing end (TE), a pressure side (PS), and a section side (SS). Similar to the component 60, the airfoil section 160c includes a supply cavity 164, a manifold cavity 166, the inlet metering holes 70, and the outlet cooling holes 72. In this example, the manifold cavity 166 is radially elongated and extends the full span from the first platform 160a to the second platform 160b.

As shown, at least one of the outlet cooling holes 72 opens to the trailing end (TE) and at least one other one of the outlet cooling holes 72 opens to either the pressure side (PS) or the suction side (SS)(open to the PS shown). In comparison to an airfoil that has a trailing end center discharge slot, the example configuration additionally permits film cooling of the pressure side (PS) and/or suction side (SS), thereby facilitating greater flexibility in the design stage to allocate cooling flow to the pressure side, suction side, and trailing end. Moreover, the outlet cooling holes 72 that open at the trailing end (TE) can be radially offset from outlet cooling holes 72 that open to the pressure side (PS) and/or suction side (SS).

For example, as shown in FIG. 4, the outlet cooling holes designated 72a open at the trailing end (TE) and the outlet cooling holes designated as 72b open to the pressure side (PS)(or alternatively to the suction side, or combinations of the pressure and suction sides). That is, the outlet cooling holes 72b are radially offset from the outlet cooling holes 72a and alternate radially from opening to the trailing end to opening at either the pressure or suction side. Such a configuration facilitates a distribution in which the cooling air emitted from the outlet cooling holes 72b provides cooling films radially between the outlet cooling holes 72a. Such a configuration, as well as other such spaced configurations, also facilitates increasing the number of outlet cooling holes 72 and spacing the outlet cooling holes 72 apart by distances that are greater than minimum required ligament distances between the holes to maintain structural integrity. The ligament length is the dimension of the material between cooling holes, and the minimum ligament distance is a minimum specified ligament length relative to the diameter of the cooling holes (e.g., a spacing of 10 hole diameters). A minimum ligament distance is typically maintained between cooling holes to ensure there is sufficient material for strength and durability requirements.

As also demonstrated in FIG. 5, the manifold cavity 166 may be located in a filler region 180 (also sometimes known as a "noodle" region). The filler region 180 is the region where fiber plies depart from each other and which is occupied by a filler material that usually does not significantly contribute to strength and durability of the component. Since the holes 70 and 72 intersect the manifold cavity 166, any observed minimum ligament distance cannot be met in the vicinity of the intersection. However, since the filler region 180 is not designed to contribute to strength or durability, placement of the intersection in the filler region 180 avoids having to meet the minimum ligament distance.

Although a combination of features is shown in the illustrated examples, not all of them need to be combined to realize the benefits of various embodiments of this disclosure. In other words, a system designed according to an embodiment of this disclosure will not necessarily include all of the features shown in any one of the figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine component comprising:
an airfoil section extending between first and second platforms, the airfoil section defining suction and pressure sides and leading and trailing ends, the airfoil section being formed of a fiber-reinforced composite and including a supply cavity, a radially-elongated manifold cavity extending from the first platform to the second platform and that shares a common divider wall with the supply cavity, an exterior wall having an exterior surface and an opposed interior surface bounding portions of the supply cavity and of the manifold cavity, the common divider wall extending from the first platform to the second platform and including one or more inlet metering holes connecting the supply cavity and the manifold cavity, and the exterior wall including outlet cooling holes connecting the manifold cavity with the exterior surface, wherein the number of the one or more inlet metering holes is equal to or less than the number of the outlet cooling holes, at least one of the outlet holes opens at the trailing end, at least one of the outlet holes opens to either the pressure side or the suction side, and an area ratio of the one or more inlet metering holes to the outlet cooling holes is less than 1:1.

2. The gas turbine engine component as recited in claim 1, wherein a ratio of the number of the one or more inlet metering holes to the number of the outlet cooling holes is from 1:1 to 1:6.

3. The gas turbine engine component as recited in claim 1, wherein the common divider wall isolates the manifold cavity from the supply cavity except for the one or more inlet metering holes.

4. The gas turbine engine component as recited in claim 1, wherein the at least one of the outlet cooling holes that opens to the trailing end is coaxial with at least one of the one or more inlet metering holes.

5. The gas turbine engine component as recited in claim 1, wherein the at least one of the outlet cooling holes that opens to either the pressure side or the suction side is radially offset from the at least one of the outlet cooling holes that opens at the trailing end.

6. The gas turbine engine component as recited in claim 1, wherein in the radial direction the outlet cooling holes alternate between opening at the trailing end and opening to either the pressure side or the suction side.

7. The gas turbine engine components as recited in claim 1, wherein the fiber-reinforced composite is a ceramic matrix composite.

8. The gas turbine engine component as recited in claim 7, wherein the radially-elongated manifold cavity is in a filler region between fiber plies of the ceramic matrix composite.

9. The gas turbine engine component as recited in claim 1, wherein a ratio of the number of the one or more inlet metering holes to the number of the outlet cooling holes is from 1:3 to 1:6.

10. The gas turbine engine component as recited in claim 1, wherein the one or more inlet metering holes restrict cooling air flow into the manifold cavity such that there is a pressure loss between the supply cavity and the manifold cavity.

* * * * *